(12) United States Patent
Smithson

(10) Patent No.: US 11,274,547 B2
(45) Date of Patent: Mar. 15, 2022

(54) TRACER INJECTION WITH INTEGRATED PRODUCT IDENTIFICATION

(71) Applicant: RESERVOIR METRICS IP HOLDINGS, LLC, Houston, TX (US)

(72) Inventor: Mitchell C. Smithson, Pasadena, TX (US)

(73) Assignee: Reservoir Metrics IP Holdings, LLC, Houston, TX (US)

( * ) Notice: Subject to any disclaimer, the term of this patent is extended or adjusted under 35 U.S.C. 154(b) by 134 days.

(21) Appl. No.: 16/643,900

(22) PCT Filed: Aug. 29, 2018

(86) PCT No.: PCT/US2018/048437
§ 371 (c)(1),
(2) Date: Mar. 3, 2020

(87) PCT Pub. No.: WO2019/050722
PCT Pub. Date: Mar. 14, 2019

(65) Prior Publication Data
US 2020/0277852 A1 Sep. 3, 2020

Related U.S. Application Data

(60) Provisional application No. 62/556,732, filed on Sep. 11, 2017.

(51) Int. Cl.
*E21B 47/11* (2012.01)
*E21B 47/12* (2012.01)
*G06K 19/07* (2006.01)

(52) U.S. Cl.
CPC .............. *E21B 47/11* (2020.05); *E21B 47/12* (2013.01); *G06K 19/07* (2013.01)

(58) Field of Classification Search
CPC .............................. E21B 47/11; E21B 47/111
See application file for complete search history.

(56) References Cited

U.S. PATENT DOCUMENTS 4,877,956 A * 10/1989 Priest ................... E21B 43/267
250/259
5,049,743 A 9/1991 Taylor, III et al.
(Continued)

OTHER PUBLICATIONS

Wikipedia; "Near-field communication", on-line encyclopedia description, dated Feb. 6, 2019, 16 pages.
(Continued)

*Primary Examiner* — John Fitzgerald
(74) *Attorney, Agent, or Firm* — Smith IP Services, P.C.

(57) ABSTRACT

A tracer injection system can include a tracer solution, a pump configured to pump the tracer solution, a data transmitter associated with the tracer solution, a data receiver configured to receive tracer characteristic data from the data transmitter, and a pump controller that variably operates the pump, based at least in part on the tracer characteristic data received by the data receiver. A tracer injection method can include associating a data transmitter with a container and a tracer solution in the container, so that the data transmitter is transported with the container and the tracer solution, receiving from the data transmitter data indicative of a characteristic of the tracer solution, and pumping the tracer solution from the container at a flow rate based at least in part on the received data.

19 Claims, 3 Drawing Sheets

(56) References Cited

U.S. PATENT DOCUMENTS

| | | | |
|---|---|---|---|
| 6,659,175 B2 | 12/2003 | Malone et al. | |
| 8,893,784 B2* | 11/2014 | Abad | E21B 47/11 |
| | | | 166/250.12 |
| 10,830,919 B1* | 11/2020 | Taylor | G01V 3/18 |
| 10,865,637 B2* | 12/2020 | Kulyakhtin | E21B 43/14 |
| 10,895,148 B2* | 1/2021 | Nyhavn | E21B 43/38 |
| 2003/0004608 A1 | 1/2003 | O'Dougherty et al. | |
| 2006/0283932 A1 | 12/2006 | Asp et al. | |
| 2009/0151939 A1* | 6/2009 | Bailey | E21B 47/11 |
| | | | 166/255.1 |
| 2010/0139386 A1* | 6/2010 | Taylor | E21B 47/003 |
| | | | 73/152.23 |
| 2013/0314209 A1 | 12/2013 | Zogg et al. | |
| 2015/0233530 A1 | 8/2015 | Sandidge | |
| 2016/0296692 A1* | 10/2016 | Agris, III | A61M 5/1723 |
| 2020/0362693 A1* | 11/2020 | Ahmadian-Tehrani | |
| | | | E21B 47/11 |

OTHER PUBLICATIONS

International Search Report with Written Opinion dated Aug. 29, 2018 for PCT Patent Application No. PCT/US2018/048437, 14 pages.

* cited by examiner

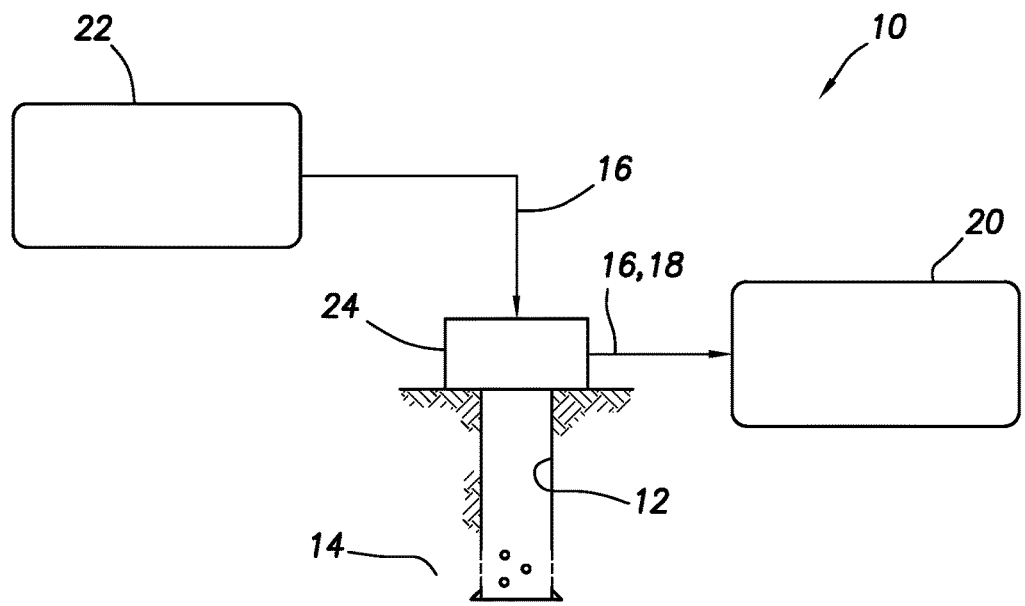
FIG.1
FIG.2
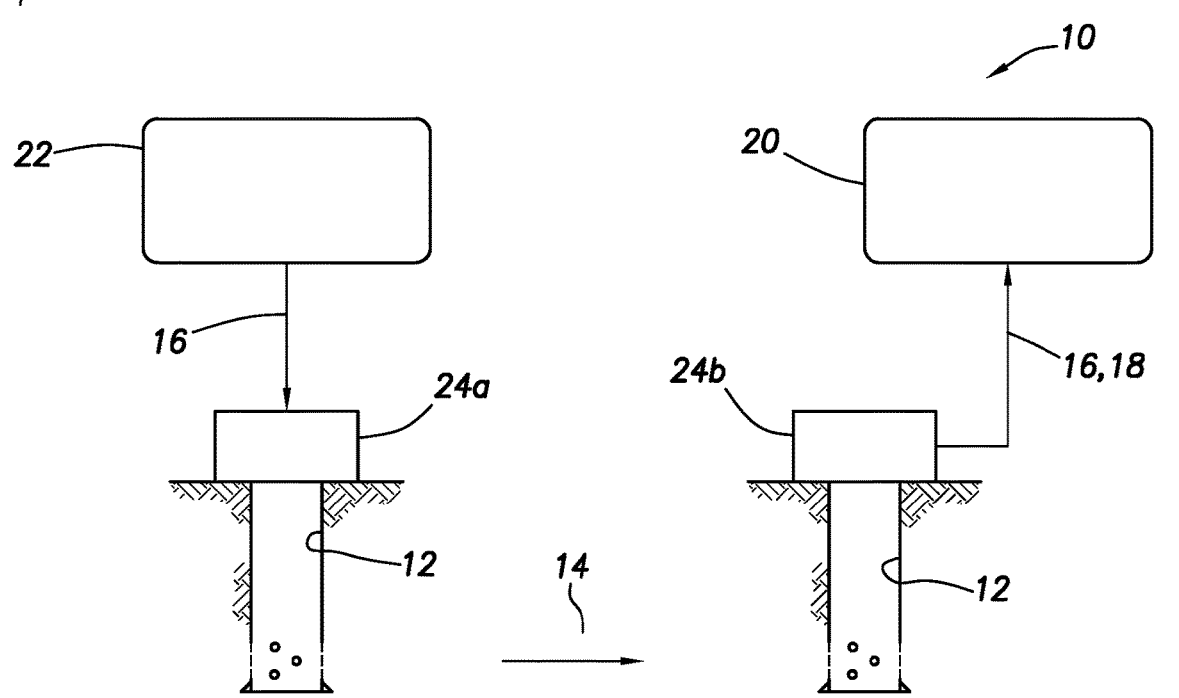

TRACER INJECTION WITH INTEGRATED PRODUCT IDENTIFICATION

CROSS-REFERENCE TO RELATED APPLICATIONS

This application is a national stage under 35 USC 371 of International Application No. PCT/US18/48437 filed on 29 Aug. 2018, which claims the benefit of the filing date of U.S. provisional application No. 62/556,732 filed on 11 Sep. 2017. The entire disclosures of these prior applications are incorporated herein by this reference.

BACKGROUND

This disclosure relates generally to equipment utilized and operations performed in conjunction with tracer injection and, in an example described below, more particularly provides for product identification and associated data capture and analysis for tracer injection operations.

A tracer may be introduced into a fluid system for a variety of different purposes. For example, the tracer may enable a determination of how, when and where a fluid flows through the system. Typically, the tracer is injected into the fluid system at a known location and time, and then the tracer is detected at a later time and a different location in the system.

Therefore, it will be readily apparent that improvements are continually needed in the arts of designing, constructing and operating tracer injection systems. Such improvements may be useful with a variety of different fluid systems including, but not limited to, subterranean wells, pipelines, other fluid conduits, etc.

BRIEF DESCRIPTION OF THE DRAWINGS

FIG. 1 is a representative partially cross-sectional view of an example of a well system and associated method which can embody principles of this disclosure.

FIG. 2 is a representative partially cross-sectional view of another example of a well system and associated method which can embody the principles of this disclosure.

DETAILED DESCRIPTION

Figure 3:
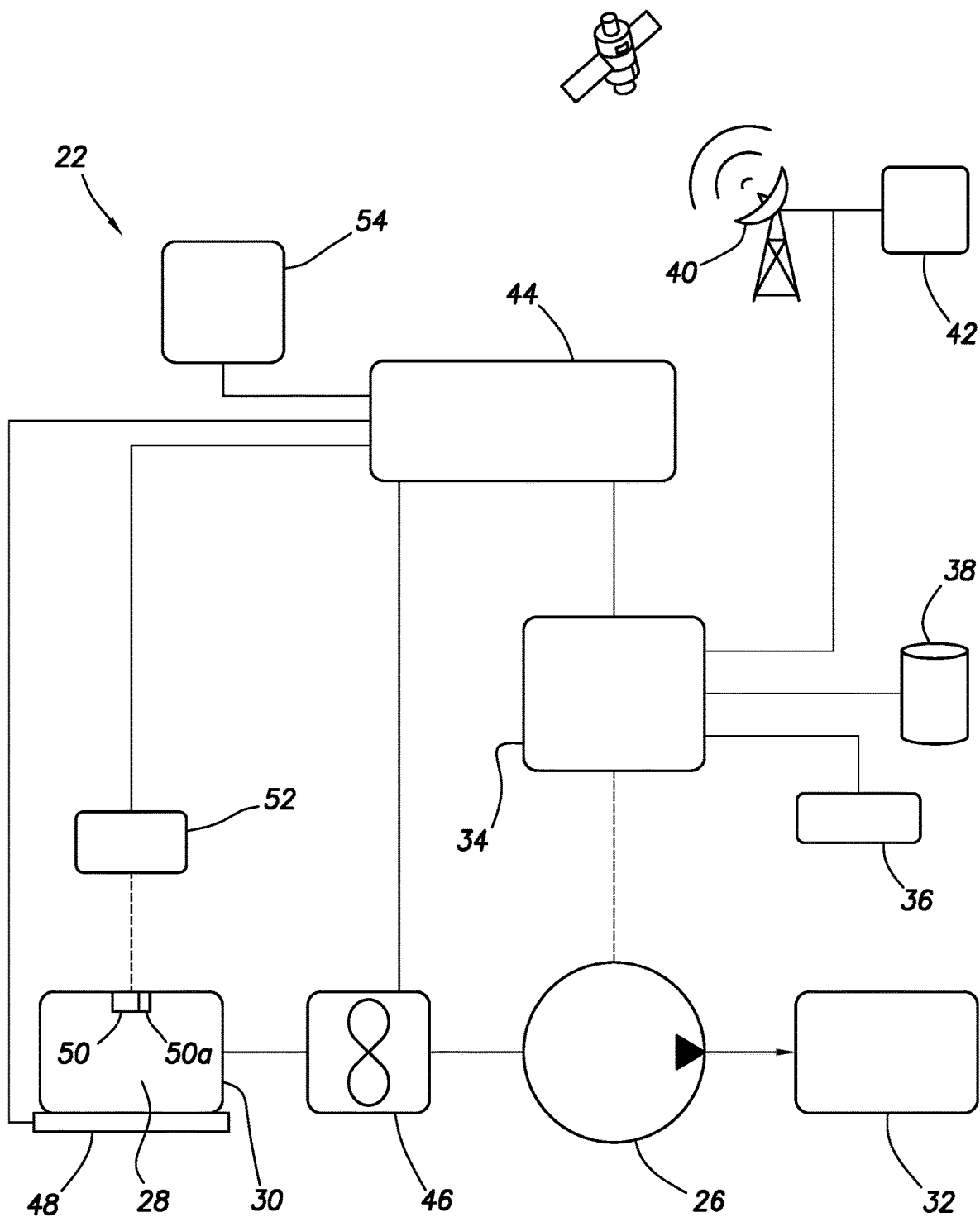
FIG. 3 is a representative schematic view of an example of a tracer injection system and method which can embody the principles of this disclosure.

Representatively illustrated in the accompanying FIGS. 1-4 and described below is a tracer injection system and associated method which can embody principles of this disclosure. However, it should be clearly understood that the tracer injection system and method are merely one example of an application of the principles of this disclosure in practice, and a wide variety of other examples are possible. Therefore, the scope of this disclosure is not limited at all to the details of the system and method described herein and/or depicted in the drawings.

Chemical tracers and radioactive tracers can be used to analyze various properties of well completions and reservoir behavior. Additionally, they may be used to trace the flow of materials in pipelines or other fluid conduits. Chemical tracers may be injected at a rate of less than 1 ppm, although other rates may be used if desired. Tracers may be soluble in water, oil or gas, in some examples.

A suitable chemical tracing method for use with the present tracer injection system is described in U.S. Pat. No. 6,659,175, the entire disclosure of which is incorporated herein by this reference. This patent describes a method for determining the extent of recovery of materials injected into an oil well, with the method including the steps of: a) preparing a material to be injected into an oil well; b) admixing therewith a chemical tracer compound at a predetermined concentration; c) injecting the admixture into an oil well; d) recovering from the oil well a production fluid; e) analyzing the production fluid for the concentration of the chemical tracer present in the production fluid; and f) calculating the amount of admixture recovered from the oil well using the concentration of the chemical tracer present in the production fluid as a basis for the calculation.

However, it should be clearly understood that the tracer injection system described herein may be used with other methods, in keeping with the scope of this disclosure. In addition, it is not necessary for the tracer injection system or method to utilize any particular chemical, radioactive or other type of tracer material or product. In some examples, unique tracer materials may be injected into respective different formation zones (e.g., during a series of fracturing operations), so that fluid flow from each of the individual zones can later be identified (e.g., during flowback), even though the flows are commingled downhole.

For subsequent data analysis, the injected tracer species, rate of injection and time of injection can be recorded for an injection operation. Although this information can be recorded manually, such manual recordkeeping is subject to error and can lead to subsequent operational errors.

Such errors may include injecting the wrong tracer or tracer species in a particular injection stage, injecting at an incorrect rate, and failing to start or stop injection at an appropriate time. It is also possible for an injection technician to misrepresent activities in order to conceal another error (such as, a late start or wrong rate).

As a result of such errors, the subsequent data analysis will present incorrect conclusions. Therefore, it would be advantageous to have a system and method to prevent inadvertent errors or data manipulation when injecting tracer materials.

In one example described below, a tracer injection system embodying the principles of this disclosure includes a pump for injecting a tracer solution. The pump is incorporated with a pump rate controller, a radio frequency identification (RFID) tag reader, a clock and a data logger. Data stored on an RFID tag and capable of being transmitted to the RFID tag reader can include the specific chemical or radioactive tracer material type (e.g., a tracer material identification code), serial and batch number, solution strength or activity level (in the case of a radioactive material), and initial volume. Different data or combinations of data may be transmitted by the RFID tag in other examples.

The pump controller can control the pump to thereby automatically adjust the injection rate based on the solution concentration (or in the case of a radioactive tracer, the activity level). A present activity level can be calculated from a known prior activity level and date, minus a decreased level based on a known half-life of the radioactive tracer material.

Measurement data is recorded throughout the injection operation. Although in this example the pump rate or speed is adjusted, in other examples the method may only require the injection rate to be known (e.g., measured) and uniform during an injection stage.

In some examples, the system may include a scale used to log the tracer injection by mass flow rate, a Global Positioning System (GPS) sensor which supplies an accurate clock and geographical location, and a volumetric flowmeter. A web server may be utilized for remote control and monitoring by the injection technician and/or by remotely located operators. Logging may be performed both locally and remotely.

In one example, the pump controller locally or remotely receives a desired dilution rate set-point or a desired flow rate of diluent, either fixed or varying over time. The pump controller operates the pump, so that a difference between the desired mass or volumetric flow rate of the tracer solution and the actual flow rate (e.g., as measured using the scale or flowmeter) is minimized.

Optional software allows a digital file with a planned schedule of tracer injection (including, for example, identification of a particular tracer material or solution to be injected at a particular point in the injection operation) to be preloaded to the pump controller. The pump controller verifies the received RFID tag data against the file data, for example, to prevent pumping an incorrect tracer material, or to avoid pumping the tracer material at an inappropriate time or rate. An alarm (such as, an audible, visual, textual, graphical or other indication) may be provided to indicate the error. The pump may be disabled unless an operational override is performed.

To avoid manual errors in the injection method, measurements (flow rate, tracer mass, tracer volume, pump speed, etc.) and time are recorded throughout the injection operation. This information, a summary and/or a data analysis and conclusions may be provided in a report to a customer.

Logged data can be tabulated to present graphs of flow rate, time of injection, and volume and mass of the injection. Records of injection volume and leftover volume may be maintained for review by regulatory agencies.

In one example, the pump receives the tracer material in solution form from a container positioned on a scale. An RFID tag in or on the container has identifying information or data stored on it. When the container is placed on the scale, or is otherwise connected to the pump, the RFID tag reader receives the identifying information.

The information is provided to a pump controller (including, for example, a controller for varying a speed of the pump, a memory for storing data and instructions, a processor for implementing instructions and performing calculations, an input for receiving the identifying information and the tracer injection schedule, an output, etc.). As mentioned above, the pump output can be varied, based on the measured, detected and input data, and the data can be recorded for subsequent analysis.

The flowmeter can be used to directly or indirectly measure a flow rate of the tracer solution output from the pump. The flowmeter may be connected upstream or downstream of the pump itself.

From the pump, the tracer solution can flow into a wellbore and thence into an earth formation penetrated by the wellbore. In other examples, the tracer solution can flow into a pipeline, another conduit or another type of fluid system.

In the tracer injection system and method, an RFID tag reader may be incorporated with a pump and pump controller, so that a tracer solution container with an affixed RFID tag is read by the RFID tag reader to control injection rate and timing based upon data stored on the RFID tag. The RFID data may comprise solution type, solution concentration, a desired dilution rate and/or a desired mass or volumetric injection rate. The solution may comprise a chemical or radioactive tracer material.

A data logger may record time, injection rate and/or solution type. The pump controller may locally or remotely receive a dilution rate set-point or a flow rate of diluent.

The pump controller may receive a schedule of injected solution types, rates and/or times. The pump controller may provide an alarm and/or prevent operation of the pump, in response to comparing the schedule to the RFID tag data and detecting an inappropriate condition (such as incorrect solution type or concentration).

A closed-loop injection rate may be measured by the flowmeter. The injection rate may be verified, logged and/or closed-loop controlled by utilizing a mass scale to continuously or periodically measure a mass of the solution in the container.

Representatively illustrated in FIG. 1 is a well system 10 and associated method which can embody the principles of this disclosure. However, it should be clearly understood that the well system 10 and method are merely one example of an application of the principles of this disclosure in practice, and a wide variety of other examples are possible. Therefore, the scope of this disclosure is not limited at all to the details of the well system 10 and method described herein and/or depicted in the drawings.

In the FIG. 1 example, a wellbore 12 has been drilled into an earth formation 14. To investigate or monitor fluid flow in the system 10, a tracer material 16 is injected into the well. In this example, the tracer material 16 may be injected into, or flow through, the earth formation 14.

Eventually, the tracer material 16 and well fluids 18 are recovered from the well, and the tracer material is detected by a tracer detection system 20. For example, if the tracer material 16 is radioactive, an activity level of the material may be detected by the detection system 20. If the tracer material 16 is a particular chemical, a spectrometer may be used to detect the presence and concentration of the chemical in the well fluids 18.

As depicted in FIG. 1, a tracer injection system 22 is used to inject the tracer material 16 (e.g., in solution form) into the well. The tracer material 16 may be injected into the well via a same wellhead 24 as the tracer material and well fluids 18 are produced from the well.

As another alternative, and to demonstrate that the scope of this disclosure is not limited to any particular embodiment, FIG. 2 representatively illustrates another example of the well system 10. In this example, the tracer material 16 is injected via one wellhead 24a, flows through the earth formation 14 between two wellbores 12, and is produced with the well fluids 18 via another wellhead 24b.

In each of the FIGS. 1 & 2 examples, the tracer material 16 can be injected at a desired rate, including a desired schedule of different rates or different tracer material types or concentrations at corresponding different times or stages of the injection operation. As used herein, the term "rate" is used to refer to a mass or volumetric flow rate (mass or volume per unit time) of the tracer solution injected into the well (or pipeline, conduit, etc., in other examples).

The term "rate" can also refer to equivalents of mass or volumetric flow rate of the tracer solution. For example, a mass or volumetric flow rate of the tracer material itself may be conveniently derived from the mass or volumetric flow rate of the tracer solution, if the concentration of the tracer material in the tracer solution is known.

As another example, the rate may be expressed as a concentration (e.g., ppm) of the tracer material in a flowing fluid. If a flow rate of the fluid is known, and the concentration and flow rate of the tracer material in the tracer solution injected into the fluid is known, the concentration of the tracer material in the fluid can be readily calculated.

As mentioned above, a pump of the tracer injection system 22 can be controlled, so that a desired rate of injection of the tracer material 16 is achieved and maintained. For example, a measured mass or volumetric flow rate of the tracer solution may be compared to a desired flow rate and, if there is a difference, the pump may be operated to increase or decrease the actual flow rate, so that the difference is minimized or eliminated.

Referring additionally now to FIG. 3, a schematic view of one example of the tracer injection system 22 is representatively illustrated. In this example, the tracer injection system 22 includes a pump 26 suitable for pumping a tracer solution 28 from a container 30 to a fluid system 32.

In the FIGS. 1 & 2 examples, the fluid system 32 corresponds to the well into which the tracer material 16 is injected. In other examples, the fluid system 32 could correspond to a pipeline, another fluid conduit, a chemical process, etc. Thus, the scope of this disclosure is not limited to use of the tracer injection system 22 with any particular type of fluid system.

An output of the pump 26 is controlled by a pump controller 34. For example, a speed of the pump 26 may be increased by the pump controller 34, in order to increase a rate of the tracer solution 28 output by the pump. Similarly, a speed of the pump 26 may be decreased by the pump controller 34, in order to decrease a rate of the tracer solution 28 output by the pump. In other examples, in which an output of the pump 26 is not dependent solely on a speed of the pump, other characteristics of the pumping operation may be controlled by the pump controller, in order to control the pumped rate of the tracer solution 28.

The pump controller 34 may include, for example, a programmable logic controller of the type suitable for controlling operation (e.g., varying a speed) of the pump 26. A proportional-integral-derivative (PID) controller may be used for maintaining a desired rate of injection of the tracer solution 28 (e.g., by controlling operation of the pump 26 as needed to minimize any difference between the desired rate and an actual measured rate).

The pump controller 34 may also include a memory for storing data and instructions, a processor for implementing instructions and performing calculations, input for receiving tracer identifying information, tracer injection rate measurements and the tracer injection schedule, an output, communication ports, etc. Components of the pump controller 34 may be integrated into a single unit, or separated among any number of units. The scope of this disclosure is not limited to use of any particular components or combination of components in the pump controller 34.

As depicted in FIG. 3, user inputs 36 are locally or remotely communicated to the pump controller 34. These user inputs 36 could include, for example, job identification, well data, commands, etc. Devices such as a keyboard, touch pad, microphone, data storage device, etc., may be used to accomplish the user inputs 36.

An injection schedule 38 for a particular injection operation may be input to the pump controller 34. The injection schedule 38 in this example includes desired injection rates of the tracer solution 28 (or the tracer material 16 thereof) during the injection operation. The desired injection rate may be different during corresponding different time periods (e.g., stages) of the injection operation. The desired type of tracer material 16 or tracer solution 28 (e.g., tracer material species, activity level, chemical type, concentration, etc.) may be different during corresponding different time periods of the injection operation.

The pump controller 34 may be in communication with one or more remote locations for various purposes. For example, data may be transmitted from the pump controller 34 to a remote location for monitoring or data analysis purposes, and data and/or commands may be transmitted from a remote location to the pump controller to operate or provide information to the pump controller.

As depicted in FIG. 3, satellite communication equipment 40 and a web server 42 are provided for communication between remote locations and the pump controller 34. However, the scope of this disclosure is not limited to use of any particular manner of communicating with remote locations, or to remote communication at all.

In the FIG. 3 example, a data logger 44 receives and/or records operational data (such as, measurements made by various sensors of the tracer injection system 22) in real time for various purposes. Data (e.g., injection rate of the tracer solution 28) is provided by the data logger 44 to the pump controller 34 for use in controlling operation of the pump 26. In some examples, this control may be of the type known to those skilled in the art as "closed-loop" control. The operational data may be recorded and preserved for subsequent data analysis.

The closed loop control, in this example, can comprise sensing, measuring or detecting a process parameter (e.g., a rate of flow of the tracer solution 28, a concentration of the tracer material 16 in the injected fluid, pump speed, etc.), comparing the actual (sensed, measured or detected) process parameter to a set-point or desired value for the process parameter, and appropriately adjusting the process as needed to minimize any difference between the actual and desired process parameters. These steps are repeated continuously or periodically during the tracer injection operation.

A mass or volumetric flowmeter 46 can be used to measure a rate of flow of the tracer solution 28 during the injection operation. Although the flowmeter 46 is depicted in FIG. 3 as being upstream of the pump 26, the flowmeter could be positioned downstream of the pump, or in any other position, in other examples. Data indicative of the tracer solution 28 flow rate is transmitted from the flowmeter 46 to the data logger 44.

A scale 48 can be used to measure a mass of the tracer solution 28 in the container 30 during the injection operation. The injection rate of the tracer solution 28 may be readily determined, based on a rate of change of the tracer solution's mass during the injection operation. Data indicative of the tracer solution 28 mass is transmitted from the scale 48 to the data logger 44.

Note that it is not necessary for both of the flowmeter 46 and the scale 48 to be used, since either of these can provide actual measured indications of the injection rate. However, the scale 48 will enable direct measurements of the tracer solution's 28 mass in the container 30, so that, for example, an alarm could be provided if a level of tracer solution becomes too low, initial and final levels of the tracer solution 28 in the container 30 can be recorded for inventory or regulatory compliance purposes, etc.

As depicted in FIG. 3, the tracer solution 28 and container 30 are provided with a data transmitter 50. For example, the data transmitter 50 could be associated with a particular tracer solution 28 and container 30, so that the data transmitter is transported with the tracer solution and container to a job site. The data transmitter 50 could be affixed to an interior or exterior of the container 30, the data transmitter could be in the tracer solution 28, or the data transmitter could be otherwise associated with the tracer solution and container.

Data stored in a memory 50a of the data transmitter 50 may include various characteristics of the tracer material 16 and/or tracer solution 28. These characteristics may include a type or species of the tracer material 16, a concentration of the tracer material in the tracer solution 28 and/or a recorded activity level and date if the tracer material is radioactive. Data indicative of the particular tracer solution 28 and container 30 (such as, identification number, container capacity, production date, inventory data, etc.) may also be stored in the data transmitter memory 50a.

In the FIG. 3 example, when the container 30 is placed in close proximity to a data receiver 52, the data is wirelessly transmitted from the data transmitter to the data receiver. The data is, in turn, provided by the data receiver 52 to the data logger 44.

The data transmitter 50 and data receiver 52 may be of the type known to those skilled in the art as radio frequency identification (RFID) transmitter and receiver. The data transmitter 50, in this example, is of the type known to those skilled in the art as an RFID "tag" and the data receiver 52 is of the type known to those skilled in the art as an RFID tag "reader." However, other types of wireless data transmitters and receivers (e.g., optical, inductive, etc.) may be used in other examples.

As depicted in FIG. 3, the data is transmitted from the transmitter 50 to the receiver 52 when the container 30 is placed on the scale 48. In some examples, the action of placing the container 30 on the scale 48 may cause the data to be transmitted (e.g., by providing a stimulus to activate a switch, or in response to a positive mass being detected by the scale, etc.).

A clock or Global Positioning System (GPS) receiver 54 may provide accurate time and geographical location data to the data logger 44 during the injection operation.

Figure 4:
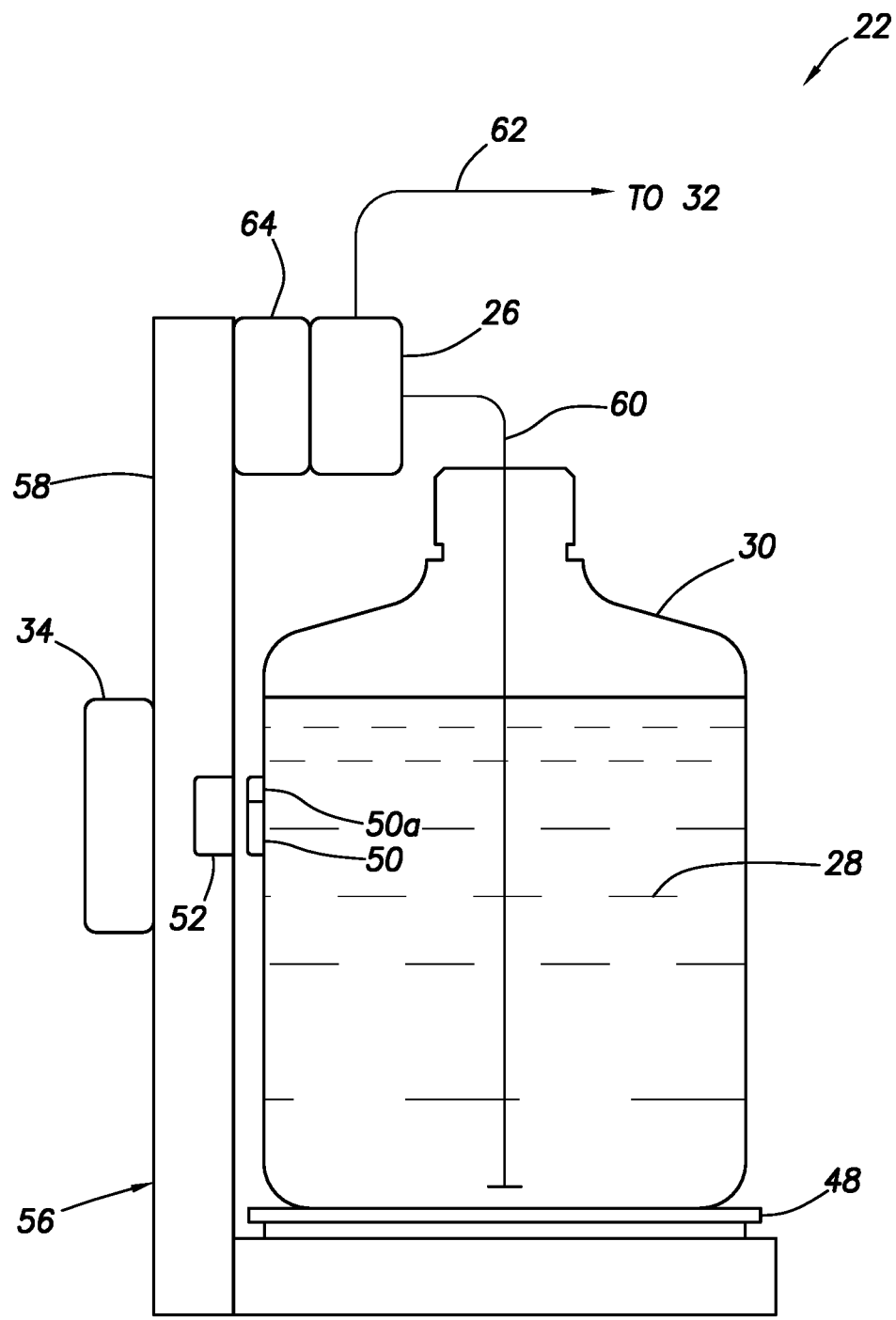
FIG. 4 is a representative side view of an example of a container receiving station of the tracer injection system.

Referring additionally now to FIG. 4, a side view of an example of a container receiving station 56 of the tracer injection system 22 is representatively illustrated. In this example, the container receiving station 56 is portable, so that it may be conveniently transported to, from and between job sites (typically without the tracer solution 28 and container 30 therein during transport). However, the container receiving station 56 may not be portable in other examples.

As depicted in FIG. 4, the data transmitter 50 is located external to the container 28, but the transmitter could be internal to the container or incorporated into another component associated with the container in other examples. The data receiver 52 is incorporated into a stand 58 positioned adjacent, or attached, to the scale 48, so that, when the container 30 is placed on the scale 48, the transmitter 50 is in close proximity to the receiver.

The stand 58 also provides a secure mounting of the pump 26 near the container 30, so that an input line 60 can be conveniently introduced into the container. When the pump 26 is operated, the tracer solution 28 is pumped to the fluid system 32 via an output line 62.

An actuator 64 (such as an electric motor and gear box) for the pump 26 may be connected to the pump controller 34. An operational speed of the actuator 64 output may be varied by the pump controller 34 as needed to achieve or maintain a desired rate of injection of the tracer material 16 or tracer solution 28 into the fluid system 32.

It may now be fully appreciated that the above disclosure provides significant advancements to the arts of designing, constructing and operating tracer injection systems. In examples described above, an injection pump 26 can be controlled, based at least in part on tracer identification data transmitted from a tracer solution 28 and container 30. The pump 26 may be controlled in a manner that minimizes any differences between a desired injection rate and a measured injection rate.

The above disclosure provides to the arts a tracer injection system 22. In one example, the tracer injection system 22 comprises a tracer solution 28, a pump 26 configured to pump the tracer solution 28, a data transmitter 50 associated with the tracer solution 28, a data receiver 52 configured to receive tracer characteristic data from the data transmitter 50, and a pump controller 34 that variably operates the pump 26, based at least in part on the tracer characteristic data received by the data receiver 52.

The data transmitter 50 may comprise a radio frequency identification (RFID) tag including a memory 50a in which the tracer characteristic data is stored.

The tracer characteristic data may include an identification of a tracer material 16 in the tracer solution 28 and/or a concentration of a tracer material 16 in the tracer solution 28. The tracer solution 28 may comprise a chemical tracer material 16 or a radioactive tracer material 16.

The pump controller 34 may control operation of the pump 26, so that a difference between a desired tracer mass or volumetric injection rate and a measured tracer mass or volumetric injection rate is minimized.

The system 22 may include a data logger 44 which records the tracer characteristic data received by the data receiver 52. The data logger 44 may record a flow rate of the tracer solution 28 pumped by the pump 26 and/or a mass of the tracer solution 28 as measured by a scale 48.

The above disclosure also provides to the arts a tracer injection method. In one example, the method comprises the steps of associating a wireless data transmitter 50 with a container 30 and a tracer solution 28 in the container 30, so that the data transmitter 50 is transported with the container 30 and the tracer solution 28; receiving from the data transmitter 50 data indicative of a characteristic of the tracer solution 28; and pumping the tracer solution 28 from the container 30 at a flow rate based at least in part on the received data.

The associating step may include affixing the data transmitter 50 to the container 30.

The pumping step may include a pump controller 34 operating a pump 26, so that a difference between the flow rate of the tracer solution 28 and a desired flow rate is minimized.

The tracer solution characteristic data may comprise an identification of a tracer material 16 or a concentration of the tracer material 16 in the tracer solution 28.

The pumping step may include a pump controller 34 operating a pump 26, so that a difference between a desired tracer injection rate and a measured tracer injection rate is minimized.

The method may include recording the received tracer solution characteristic data. The method may include recording at least one of a volumetric flow rate and a mass flow rate of the pumped tracer solution 28. The pumping step may include a pump controller 34 controlling operation of a pump 26, so that a difference between a desired tracer mass injection rate and a measured tracer mass injection rate is minimized.

Although various examples have been described above, with each example having certain features, it should be understood that it is not necessary for a particular feature of one example to be used exclusively with that example.

Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," "upward," "downward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A tracer injection system, comprising:
a tracer solution;
a pump configured to pump the tracer solution;
a data transmitter associated with the tracer solution;
a data receiver configured to receive tracer characteristic data from the data transmitter; and
a pump controller that variably operates the pump, based at least in part on the tracer characteristic data received by the data receiver,
in which the data transmitter comprises a radio frequency identification (RFID) tag including a memory in which the tracer characteristic data is stored.

2. The system of claim 1, in which the tracer characteristic data comprises an identification of a tracer material in the tracer solution.

3. The system of claim 1, in which the tracer characteristic data comprises a concentration of a tracer material in the tracer solution.

4. The system of claim 1, in which the tracer solution comprises a chemical tracer material or a radioactive tracer material.

5. The system of claim 1, in which the pump controller controls operation of the pump, so that a difference between a desired tracer injection rate and a measured tracer injection rate is minimized.

6. The system of claim 1, further comprising a data logger which records the tracer characteristic data received by the data receiver.

7. The system of claim 6, in which the data logger records a flow rate of the tracer solution pumped by the pump.

8. A tracer injection system, comprising:
a tracer solution;
a pump configured to pump the tracer solution;
a data transmitter associated with the tracer solution;
a data receiver configured to receive tracer characteristic data from the data transmitter;
a pump controller that variably operates the pump, based at least in part on the tracer characteristic data received by the data receiver; and
a data logger which records the tracer characteristic data received by the data receiver, in which the data logger records a mass of the tracer solution as measured by a scale.

9. The system of claim 8, in which the pump controller controls operation of the pump, so that a difference between a desired tracer mass injection rate and a measured tracer mass injection rate is minimized.

10. A tracer injection method, comprising:
associating a wireless data transmitter with a container and a tracer solution in the container, so that the data transmitter is transported with the container and the tracer solution;
receiving from the data transmitter data indicative of a characteristic of the tracer solution; and
pumping the tracer solution from the container at a flow rate based at least in part on the received data.

11. The method of claim 10, in which the associating comprises affixing the data transmitter to the container.

12. The method of claim 10, in which the pumping comprises a pump controller operating a pump, so that a difference between the flow rate of the tracer solution and a desired flow rate is minimized.

13. The method of claim 10, in which the tracer solution characteristic data comprises an identification of a tracer material in the tracer solution.

14. The method of claim 10, in which the tracer solution characteristic data comprises a concentration of a tracer material in the tracer solution.

15. The method of claim 10, in which the pumping comprises a pump controller operating a pump, so that a difference between a desired tracer injection rate and a measured tracer injection rate is minimized.

16. The method of claim 10, in which the data transmitter comprises a radio frequency identification (RFID) tag including a memory in which the tracer characteristic data is stored.

17. The method of claim 10, further comprising recording the received tracer solution characteristic data.

18. The method of claim 17, further comprising recording at least one of a volumetric flow rate and a mass flow rate of the pumped tracer solution.

19. The method of claim 18, in which the pumping comprises a pump controller controlling operation of a pump, so that a difference between a desired tracer mass injection rate and a measured tracer mass injection rate is minimized.

* * * * *